United States Patent
Chiou et al.

(10) Patent No.: US 6,473,413 B1
(45) Date of Patent: Oct. 29, 2002

(54) METHOD FOR INTER-IP-DOMAIN ROAMING ACROSS WIRELESS NETWORKS

(75) Inventors: Jiann-Ching Chiou, Taipei (TW); Yuh-Rong Leu, Taipei (TW); Ming-Young You, Taipei (TW)

(73) Assignee: Institute For Information Industry (TW)

( * ) Notice: Subject to any disclaimer, the term of this patent is extended or adjusted under 35 U.S.C. 154(b) by 0 days.

(21) Appl. No.: 09/338,291

(22) Filed: Jun. 22, 1999

(51) Int. Cl.[7] ................................................. H04Q 7/00
(52) U.S. Cl. ....................... 370/331; 370/401; 370/475; 455/432; 455/436
(58) Field of Search ............................. 370/352, 331, 370/338, 401, 475, 328, 277, 310, 389, 392, 353, 356, 400; 709/227, 228; 455/432, 433, 434, 435, 436, 437, 438, 439, 442, 445, 422

(56) References Cited

U.S. PATENT DOCUMENTS

| | | | | |
|---|---|---|---|---|
| 5,353,331 A | * | 10/1994 | Emery et al. | 455/461 |
| 5,490,139 A | * | 2/1996 | Baker et al. | 370/401 |
| 5,819,178 A | * | 10/1998 | Cropper | 455/433 |
| 5,958,018 A | * | 9/1999 | Eng et al. | 709/146 |
| 6,160,804 A | * | 12/2000 | Ahmed et al. | 370/349 |
| 6,195,705 B1 | * | 2/2001 | Leung | 709/245 |
| 6,414,950 B1 | * | 7/2002 | Rai et al. | 370/338 |

* cited by examiner

*Primary Examiner*—Ricky Ngo
*Assistant Examiner*—Tri H. Phan

(57) ABSTRACT

A method involves in integrating the communication mechanisms of IAPP and mobile IP is provided for allowing a mobile station to roam among various APs in different IP subnets. When a mobile station roams to a new IP subnet, it will issue a reassociation request to an Access Point A in the new IP subnet. In response to the reassociation request, the Access Point A will need the IP address of the previous Access Point B in the previous IP subnet to send the handoff request to the Access Point B. So, the Access Point A can find the IP address of the Access Point B via the communication mechanism of mobile IP of IP layer and then send the handoff request frame to the Access Point B. In turn, upon receiving the handoff request frame, the Access Point B deletes the record of the mobile station in the association table and then sends the handoff response frame back to the Access Point A via the communication mechanism of mobile IR. The unicast handoff response frame will be forwarded to the Access Point A. Consequently, the Access Point A can complete the handoff procedure.

14 Claims, 5 Drawing Sheets

METHOD FOR INTER-IP-DOMAIN ROAMING ACROSS WIRELESS NETWORKS

BACKGROUND OF THE INVENTION

A. Field of the Invention

The present invention relates to a method for routing datagrams across wireless networks, especially to a method which integrates the communication mechanisms of Mobile IP (Internet Protocol) and IAPP (Inter Access Point Protocol) for routing datagrams between a MAC layer and a network layer, thereby to allow a mobile station to roam among various Access Points in different IP subnets.

B. Description of the Prior Art

The current IEEE 802.11 standard only defines the protocols below the MAC layer for wireless LAN (hereinafter WLAN). The protocols on network layer have not been defined for WLAN yet. The communication among the Access Points (AP) in the WLANs is following the communication mechanisms defined by the Inter Access Point Protocol (IAPP). Accordingly, the IAPP is implemented on top of IP and is an extension to the exist management protocols. By specifying how Access Points will communicate with one another, the IAPP defines methods to handle access point awareness as well as roaming by mobile stations across cells. According to IAPP, when an AP is enabled, it broadcasts an announce request packet in the WLAN. Another AP in the same LAN will reply with a response packet upon receiving the announce request packet. In the response packet, it contains the information about the AP, such as the MAC address and IP address of the AP. When a mobile station roams to another WLAN served by another AP, the mobile station will send a reassociation request to the new AP. The new AP will have to find the IP address of the AP originally served for the mobile station so as to complete a handover request procedure, which will allow the new AP to replace the role of the original AP and provide services for the mobile station.

However, if the mobile station moves to another WLAN in a different IP subnet, the conventional communication mechanism will be blocked by the router. Consequently, the new AP will not be able to obtain the IP address of the original AP via broadcasting. The reason is because most routers are configured to block the traffic of broadcast packets so as to prevent the occurrence of broadcast storm. For this reason, APs in different IP subnets will not be able to communicate with one another via broadcasting packets as defined by the IAPP. In another words, when a new AP receives a reassociation request from a mobile station, it has no way to get the IP address of the original AP if they are in different IP subnets. Consequently, a handover procedure will not be completed. As a result, the original AP might determine that it still serves for the mobile station. At this time, the original AP will not forward any frame that destines to the mobile station sent by another mobile station in the same WLAN. Such restriction will seriously limit the roaming area of a mobile station.

SUMMARY OF THE INVENTION

Accordingly, it is an object of the present invention to provide a method which integrates the communication mechanism of mobile IP and IAPP, thereby to allow mobile stations to roam across various Access Points in different IP subnets.

It is another object of the present invention to provide a communication mechanism which can readily allow mobile stations to roam across various Access Points in different IP subnets without the requirement of extra hardware implementation or software configurations.

In accordance with the invention, a method involving in integrating the communication mechanisms of IAPP and mobile IP is provided to allow a mobile station to roam among various APs of different IP subnets. When a mobile station roams to a new IP subnet, it will broadcast a reassociation request to an Access Point A in another IP subnet. In response to the reassociation request, the Access Point A will need the IP address of the previous Access Point B in the previous IP subnet to forward the handoff request to the Access Point B. So, the Access Point A can find the IP address of the Access Point B via the communication mechanism of mobile IP of IP layer and then send the handoff request frame to the Access Point B. In turn, upon receiving the handoff request frame, the Access Point B deletes the record of the mobile station in the association table and then sends the handoff response frame back to the Access Point A via the communication mechanism of mobile IP. The unicast handoff response frame will be forwarded to the Access Point A. Consequently, the Access Point A can complete the handover procedure.

BRIEF DESCRIPTION OF THE DRAWINGS

These and other objects and advantages of the present invention will come apparent by reference to the following description and accompanying drawings wherein.

DETAILED DESCRIPTION OF THE PREFERRED EMBODIMENTS

Figure 1:
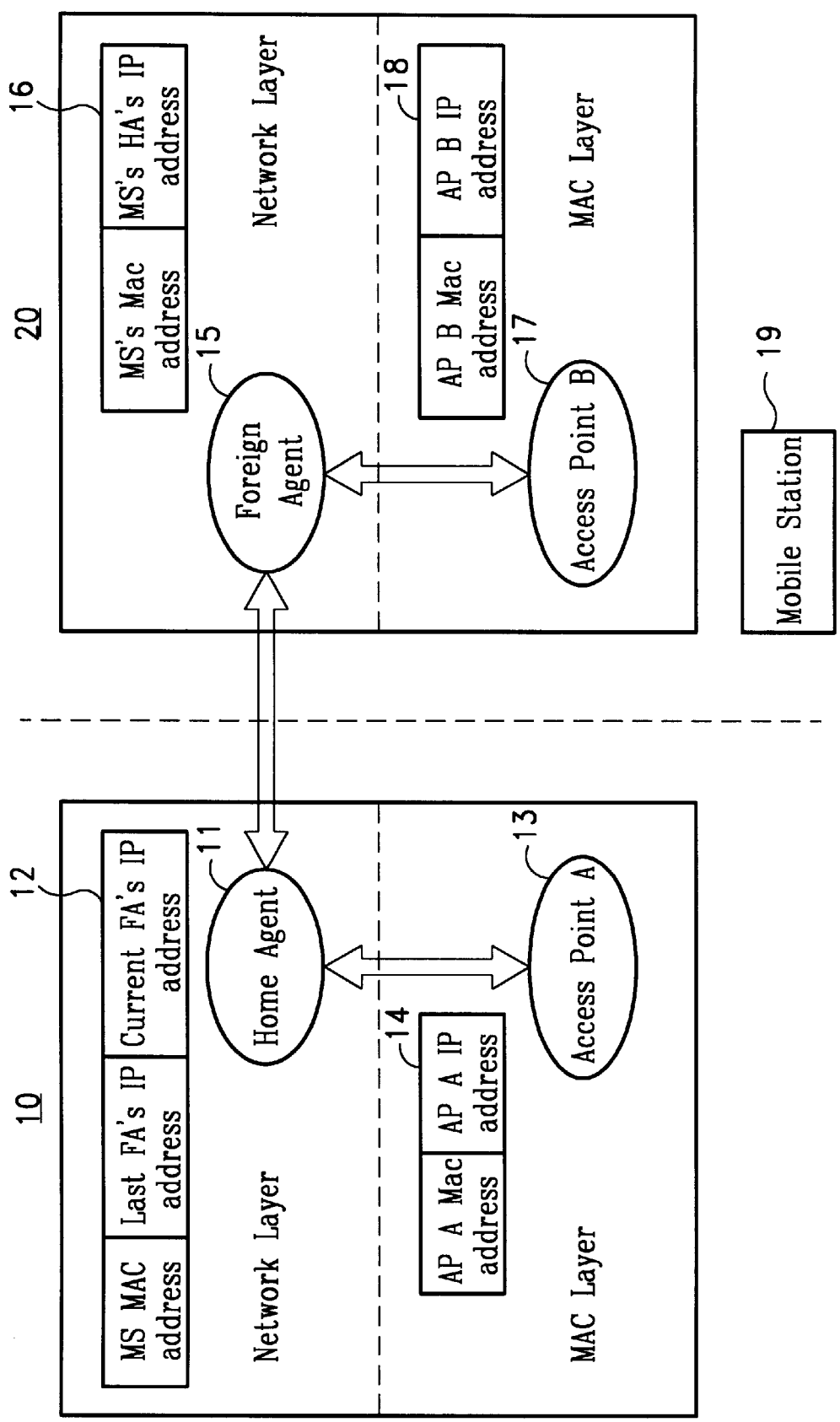
FIG. 1 is a schematic diagram showing a mobile station is roaming from the original WLAN to a new WLAN according to the method of the present invention.

To allow the operations for a mobile station over a wide range of networks, the present invention provides a communication mechanism for communicating a MAC layer protocol with a network layer protocol without altering current mobile IP and IAPP protocol, thereby to allow a mobile station to roam across different IP subnets.

In general, the mobile IP is a protocol for the network layer communication. It depends on the Agents in each WLAN to communicate with one another on the network layer for mobile stations. The Agent is activated by an Access Point. It can be distinguished as Home Agent and Foreign Agent based on the functions it performed on the network layer.

For instance, the Agent that the mobile station initially registered is called "Home Agent" of the mobile station while other Agents in other IP subnets are called its "Foreign Agent". Each Agent maintains a registration table for recording the roaming information of the mobile station among various WLANs. The records of the registration table are also based on the functions performed by the Home Agents and the Foreign Agents. For instance, the registration table of the Home Agent records the MAC address of the mobile station, the IP address of the Last Foreign Agent served for the mobile station, and the IP address of the current Foreign Agent now served for the mobile station. On the other hand, the registration table of the Foreign Agent records the MAC address of the mobile station, and the IP address of the Home Agent of the mobile station.

Whenever a mobile station moves from one WLAN to another WLAN, the new Agent will have to inform the Home Agent to update its records in the registration table, including the IP address of the current Foreign Agent and the IP address of last Foreign Agent. The current Foreign Agent of the mobile station will also establish a record in its registration table, including the MAC address of the mobile station, and the IP address of the Home Agent of the mobile station.

In contrast to the mechanism of the Mobile IP, the IAPP uses each Access Point to periodically broadcast its information and collect the information of other Access Points in the same subnet. When the mobile station roams to another subnet served by another Access Point, the mobile station will find that it has moved to a new area served by another Access Point from the beacon received. So, the mobile station will send a reassociation request to the new Access Point to enable handoff procedure. At first, the Access Point will insert the information of the mobile station to the association table. Then, the Access Point will look up the AP table according to the MAC address of the original Access Point which is recorded in the reassociation request packet. If the record of the original Access Point is found, the IP address obtained will be inserted into the handoff request packet as a destination address. When the destination AP receives the handoff request packet, it looks up its association table. If the association table contains the information of the mobile station, the record of the mobile station will be deleted and Access Point will send the handoff response packet. On the other hand, if AP table does not contain the information of the original Access Point, the new AP will need to find the Home Agent of the mobile station via the registration table of the Foreign Agent. Then, from the registration table of the Home Agent, the IP address of the last Foreign Agent can be found. After finding the IP address of the last Foreign Agent, the destination AP can send a handoff request to the original Access Point to complete the handoff request procedure.

The integrated communication mechanism for the mobile IP and the IAPP can be illustrated in FIG. 1. Refer to FIG. 1, it shows two WLANs in different IP subnets, 10, 20 respectively. The mobile station 19 moves from original WLAN 10 to the new WLAN 20. In the original WLAN 10, there is an Access Point A (AP A) 13, and a Home Agent (HA) 11, which are located in different host machines. The AP A 13, following the IAPP communication mechanism, is responsible for the Access Point service for WLAN 10 and periodically updating the AP table 14. The AP table records the MAC address of the AP A 13 and the IP address of the AP A 13.

On the other hand, HA 11, following the mobile IP communication mechanism, is responsible for recording the roaming information of the mobile station 19 in a registration table 12. The registration table 12 includes information of the MAC address of the mobile station, the IP address of the Last Foreign Agent of the mobile station, the IP address of the current Foreign Agent of the mobile station.

In the second WLAN 20, there is an Access Point B (AP B) 17, and a Foreign Agent 15, which are also located in different host machines. The job of AP B 17 is the same as that of AP A 13. It follows the IAPP communication mechanism to function as an Access Point and periodically updates its AP table 18. The AP table 18 contains the information of the MAC address of the AP B 17 and the IP address of the AP B 17.

The Foreign Agent 15, following the communication mechanism of mobile IP, maintains a registration table 16 for recording the roaming information of the mobile station 19. It records the MAC address of the mobile station (MS MAC address), the IP address of the Home Agent of the mobile station (MS's HA's IP address)

According to the structure as illustrated in FIG. 1, when a mobile station 19 roams to a WLAN 20, the mobile station 19 will issue are association request. AP B 17 receives the reassociation request from the mobile station 19, and then finishes the reassociation procedure. After that, the AP B 17 looks up its AP table 18 to find the IP address of the AP A 13 for the mobile station, so as to send a handoff request frame to the AP A 13. At the same time, the handoff request is recorded in a handoff list.

If the IP address of the AP A 13 is already recorded in the AP table 18, the AP B 17 can directly forward the handoff request frame to the AP A 13. If not, the original AP and the new AP of the mobile station 19 are in different subnets and AP B 17 will broadcast the handoff request. After Foreign Agent 15 received the handoff request, it will use the MAC address of the mobile station 19 to look up its registration table 16 to see if the registration success event has been set. In other words, the FA A 15 will set a registration success event when the mobile station 19 has successfully been registered.

The FA A 15 will lookup the IP address of the HA 11 in the registration table 16 using the MAC address of the mobile station 19 as an index. After finding the IP address of the HA 11, a unicast IAPP handoff request frame will be forwarded to HA 11. The FA A 15 will establish a proxy IAPP table to record the IP address of the AP B 17 and the MAC address of the mobile station 19.

HA 11 receives the unicast IAPP handoff request frame from FA A 15. Since the association table of the AP of the HA 11 does not contain any information of the mobile station 19 yet, so the IAPP handoff request frame is broadcast in the WLAN 10. The MAC address of the mobile station 19 and the IP address of FA A 15 is recorded in the proxy IAPP table of HA 11.

After the AP A 13 receives the IAPP handoff request frame, it checks the association table to see if there is a record of the MAC address of such mobile station 19. If yes, it deletes the record of the mobile station 19 from the association table so that the service to the mobile station 19 is terminated. Then, it sends an IAPP handoff response frame to HA 11.

After receiving the unicast IAPP handoff response frame from AP A 13, the HA 11 checks the proxy IAPP table to see if there is the MAC address of the mobile station 19. If yes, it deletes the record and then sends an IAPP response frame to FA A 15.

FA A 15 receives the unicast IAPP handoff response frame from HA 11. Then, it uses the MAC address of the mobile station to check the proxy IAPP table to see if there is record of the mobile station 19. If yes, the IAPP handoff response frame will be forwarded to AP B 17, the record will then be deleted.

AP B 17 receives a unicast IAPP handoff response frame. Then, it checks the handoff list to see if such handoff request has ever been sent. If yes, the handover procedure is complete. If not, the AP B 17 does nothing.

Figure 2:
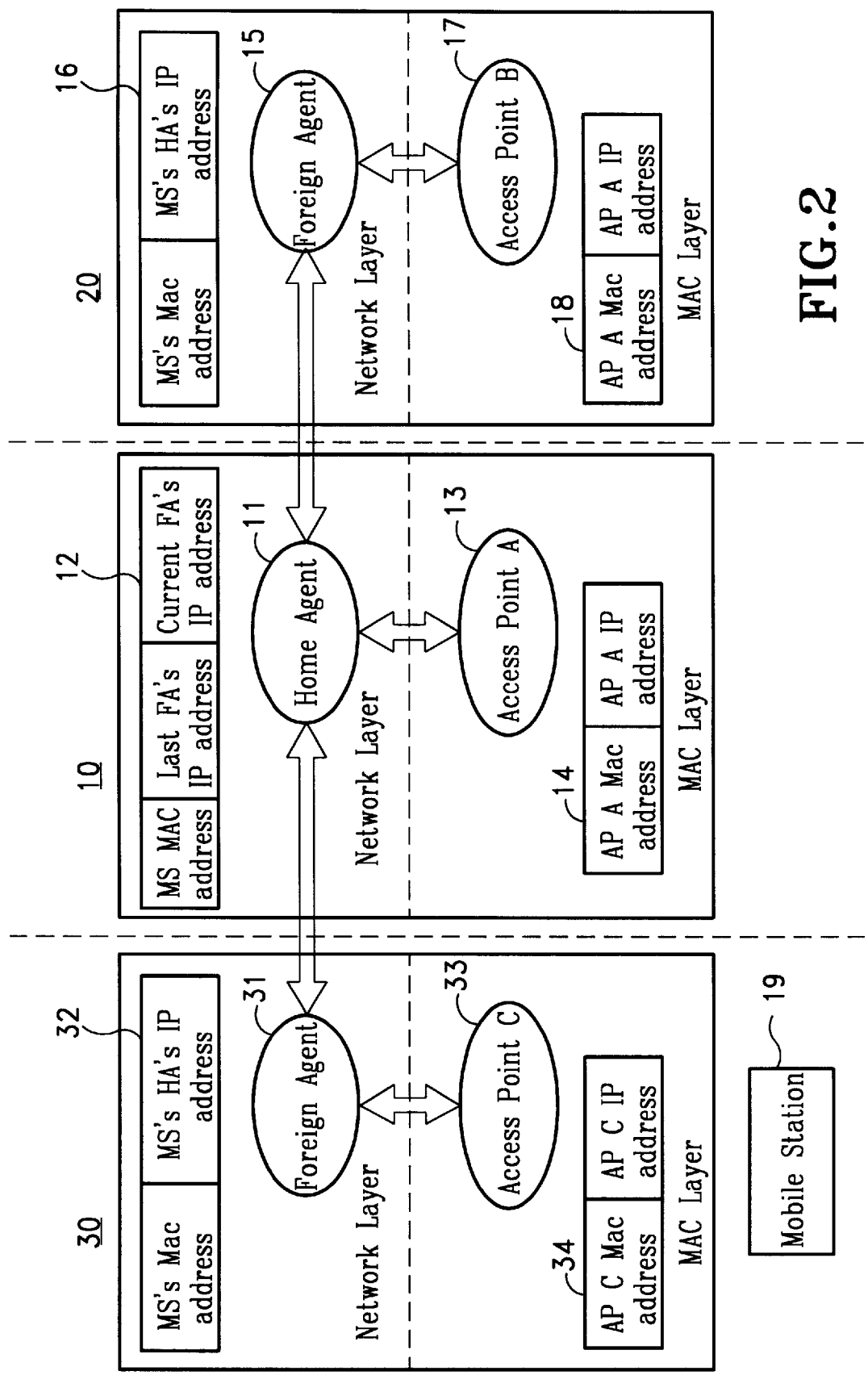
FIG. 2 is a schematic diagram showing a mobile station is roaming from another WLAN to another new WLAN according to the method of the present invention.

Another situation is that a mobile station 19 is roaming from a second WLAN to a third WLAN, as illustrated in FIG. 2. FIG. 2 shows three wireless LANs 10, 20, 30 respectively. The mobile station 19 roams from the second WLAN 20 to the third WLAN 30. In addition to AP A 13, HA 11, FA A 15, and AP B 17 of the first WLAN 10 and the second WLAN 20, there are also an AP C 33, and an FA B 31 in the third WLAN 30.

When the mobile station 19 is roaming from WLAN 20 to the third WLAN 30, it sends a reassociation request to AP C 33. After finishing the reassociation procedure, AP C 33 will lookup its AP table 34 using the MAC address of its previous Access Point to find the IP address of the previous Access Point for the mobile station 19, so as to send the handoff request frame to the previous Access Point. Since AP C 33 located in a different subnet from AP B 17, so a record of the IP address of its previous Access Point is not established in the AP table. This makes AP C 33 broadcast the handoff request frame. Thus, AP C 33 lookups the registration table 32 of the FA B 31 to see if a registration success event has been set by the FA B 31 for the mobile station 19.

FA B 31 receives the broadcast IAPP request from AP C 33. It may find the IP address of the Home Agent 11 from the registration table 32 based on the MAC address of the mobile station 19. After finding the IP address of the Home Agent 11, the IAPP handoff request frame can be unicasted to the Home Agent 11. The IP address of the AP C 33 and the MAC address of the mobile station 19 will also be inserted into the proxy IAPP table of FA B 31.

Home Agent 11 receives the unicast IAPP handoff request frame from the FA B 31. It may check the registration table 12 to find the IP address of the Last Foreign Agent for the mobile station 19, which is FA A 15 of the second WLAN 20. Then, Home Agent 11 sends IAPP handoff request to FA A 15, and inserts the MAC address of the mobile station and the IP address of FA B 31 into the proxy IAPP table of HA 11.

FA A15 receives the unicast IAPP handoff request from HA 11, then checks the registration table 16 to determine if the mobile station is in its service domain. Then, it continues to search the mobile station 19 in its association table. It will find that the mobile station 19 is not recorded in the association table. So, the IAPP handoff request frame is broadcast. The MAC address of the mobile station 19 and the IP address of the HA 11 is recorded in the proxy IAPP table of FA A 15.

After the AP B 17 received the broadcast IAPP handoff request, it looks up its association table to find the MAC address of the mobile station 19. If found, it deletes the record of the mobile station 19 in the association table to terminate serving the mobile station 19. Then, the AP B 19 sends the IAPP handoff response frame to FA A 15.

After the FA A 15 receives the unicast IAPP handoff response from AP B 17, FA A 15 checks the proxy IAPP table to see if there is the MAC address of such mobile station. If yes, the IAPP handoff response frame will be forwarded to Home Agent 11 following the IP address founded. Then, the record will be deleted.

After the Home Agent 11 received the unicast IAPP response frame from Foreign Agent A 15, it looks up the proxy IAPP table to see if there is the MAC address of the mobile station. If yes, the IP address of the FA B 31 can be found using the MAC address of the mobile station 19 as an index. Then, the IAPP response frame can be forwarded to FA B 31. The record in the proxy IAPP table of the mobile station can then be deleted.

FA B 31 receives the unicast IAPP response frame from HA 11. It checks if there exists a record of such mobile station in the proxy IAPP table. If yes, using the MAC address of the mobile station 19 as an index to find the IP address of AP C 33. The IAPP response frame will be forwarded to the AP C 33 according to the IP address found. Then, the record in the proxy IAPP table of the mobile station 19 will be removed.

AP C 33 receives a unicast IAPP handoff response frame. Then, it checks the handoff list to find if a handoff request has ever been sent. If yes, the record will be deleted and the handoff procedure will be completed. If not, the AP B 33 does nothing.

The third situation is that the mobile station 19 moves from another WLAN 20 to its home WLAN 10. The situation can be illustrated using FIG. 1 as an example again.

When the mobile station 19 moves back to its home WLAN 10, the mobile station 19 will send a reassociation request to the new Access Point. After the AP A 13 receives the reassociation request from the mobile station 19, and finishes the reassociation procedure, it checks the registration table 12 of the Home Agent 11 to find if the registration success event has been set. If yes, AP A 13 will lookup its AP table 14 to find the IP address of its previous AP using the MAC address of the previous AP as an index. Then, the IAPP handoff request frame can send to the previous AP for processing the handover procedure. However, since AP A 13 and AP B 17 are in different subnets, so the AP table 14 does not contain the information of AP B 17. In such case, AP A 13 will broadcast the IAPP handoff request frame. Then, HA 11 checks its association table and find the mobile station is not in its serving area upon receiving the broadcast IAPP handoff request frame. HA 11 further checks its registration table to find the last Foreign Agent FA A 15 and then send the IAPP handoff request frame to FA A 15. After that, the MAC address of the mobile station 19 and the IP address of the AP A 13 will be recorded in its proxy IAPP table.

FA A 15 receives the unicast IAPP handoff request from HA 11. Then, it checks the registration table 16 to find if there is the MAC address of the mobile station 19. Since the mobile station 19 has registered in the registration table 16, so it continues to lookup its association table. Since the mobile station 19 is not recorded in the association table, so the MAC address of the mobile station 19 and the IP address of HA 11 are recorded in the proxy IAPP table. Then, FA A 15 broadcasts the IAPP handoff request frame.

After AP B 17 received the broadcast IAPP handoff request frame, it checks if the MAC address of the mobile station 19 is recorded in the association table. If yes, delete the record, and then forward the IAPP response frame to the FA A 15.

FA A 15 receives the unicast IAPP response from AP B 17. It checks the proxy IAPP table to see if there is such record. If yes, the record will be deleted. The IAPP response frame will be forwarded to the HA 11.

After the HA 11 received the IAPP response frame, it checks the proxy IAPP table to see if there is such a record. If yes, the IAPP response frame will be forwarded to AP A 13.

Then, AP A 13 receives the IAPP response frame. It checks if it has ever sent an IAPP handoff request. If yes, the handoff procedure is complete. If not, AP A 13 does nothing.

Figure 3:
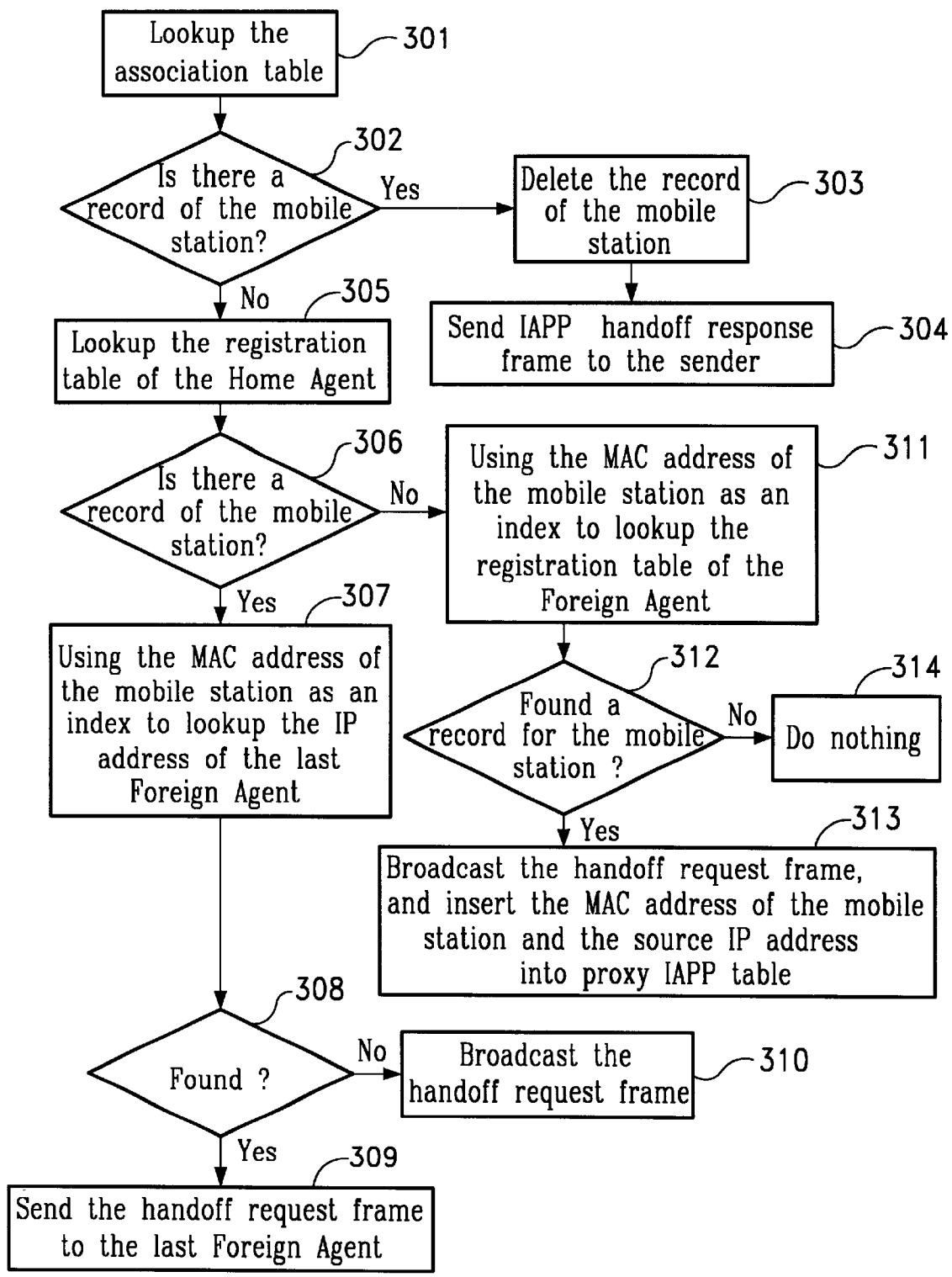
FIG. 3 is a flowchart showing the procedures when receiving the unicast IAPP handoff request according to the method of the present invention.

Accordingly, the method of the present invention can be illustrated more clearly from FIG. 3A–3C. When receiving the reassociation request, and after the reassociation procedure is complete, the IAPP handoff request frame will be issued. FIG. 3A illustrates the flowchart showing the procedure when the unicast IAPP handoff request is received.

301: Lookup the association table.
302: Determine if there is a record of the mobile station? If yes, go to step 303, if not, go to step 305.
303: Delete the record of the mobile station if found.
304: Send IAPP handoff response frame to the sender.
305: Lookup the registration table of the Home Agent.
306: Determine if there is a record of the mobile station? If yes, go to step 307, if not, go to step 311.
307: Using the MAC address of the mobile station as an index to lookup the IP address of the last Foreign Agent.
308: Determine if the IP address of the last Foreign Agent is found? If found, go to step 309, if not, go to step 310.
309: Send the handoff request frame to the last Foreign Agent.
310: Broadcast the handoff request frame.
311: Using the MAC address of the mobile station as an index to lookup the registration table of the Foreign Agent.
312: Determine if there is a record for the mobile station? If yes, go to step 313, if not, go to step 314.
313: Broadcast the handoff request frame, and insert the MAC address of the mobile station and the source IP address into the proxy IAPP table.
314: Do nothing.

Figure 4:
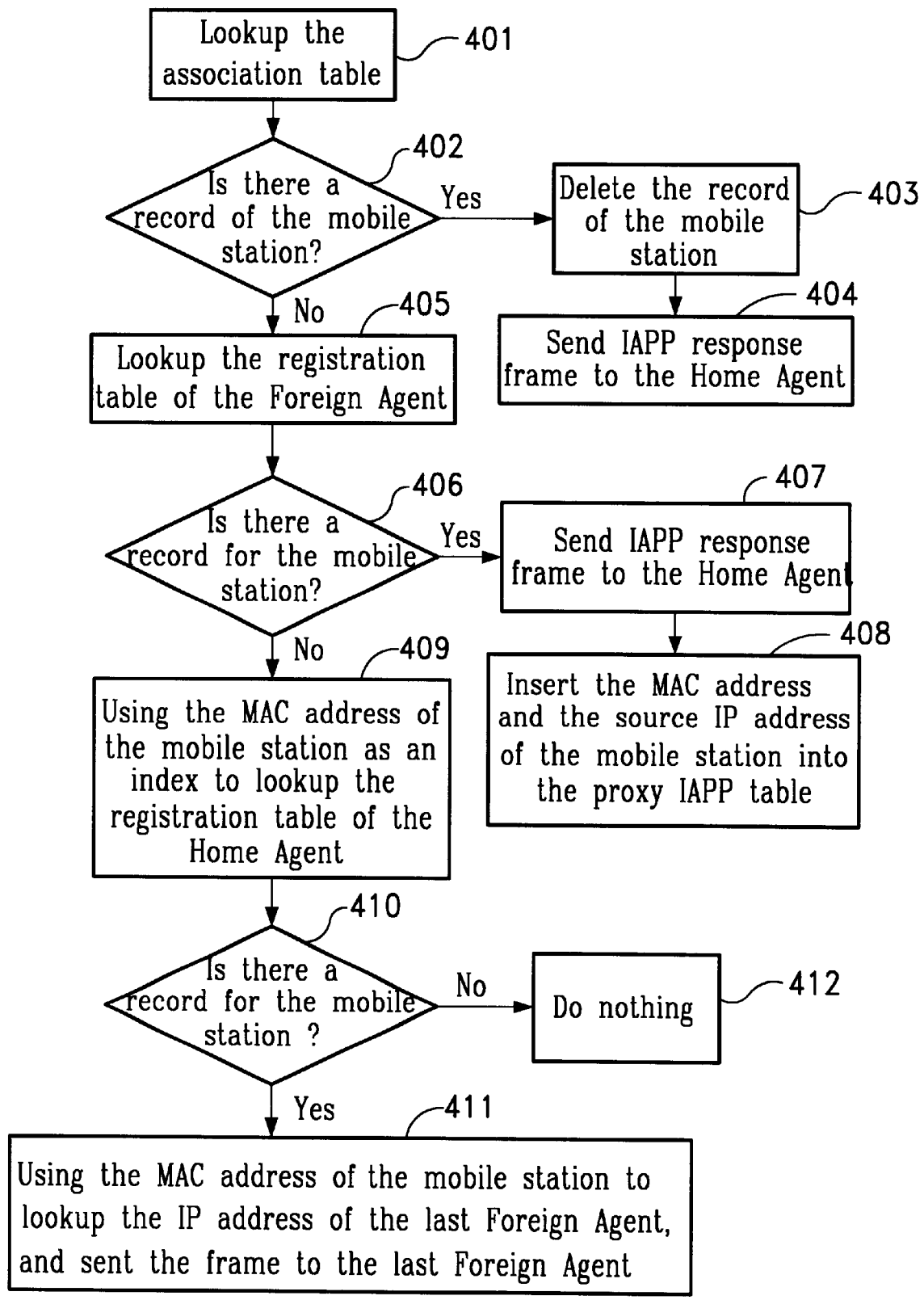
FIG. 4 is a flowchart showing the procedures when receiving the broadcast IAPP handoff request according to the method of the present invention.

Refer to FIG. 4 for showing the procedure when the broadcast IAPP handoff request frame is received.

401: Lookup the association table.
402: Determine if there Is a record of the mobile station? If yes, go to step 403, if not, go to step 405.
403: Delete the record of the mobile station.
404: Send IAPP response frame to the sender
405: Lookup the registration table of the Foreign Agent.
406: Determine if there Is a record for the mobile station? If yes, go to step 407, if not, go to step 409.
407: Send the IAPP response frame to the Home Agent of the mobile station.
408: Insert the MAC address and the source IP address of the mobile station into the proxy IAPP table.
409: Using the MAC address of the mobile station as an index to lookup the registration table of the Home Agent.
410: Determine if the record of the mobile station is found? If yes, go to step 411, if not, go to step 412.
411: Using the MAC address of the mobile station as an index to lookup the IP address of the last Foreign Agent, and send the frame to the last Foreign Agent.
412: Do nothing.

Figure 5:
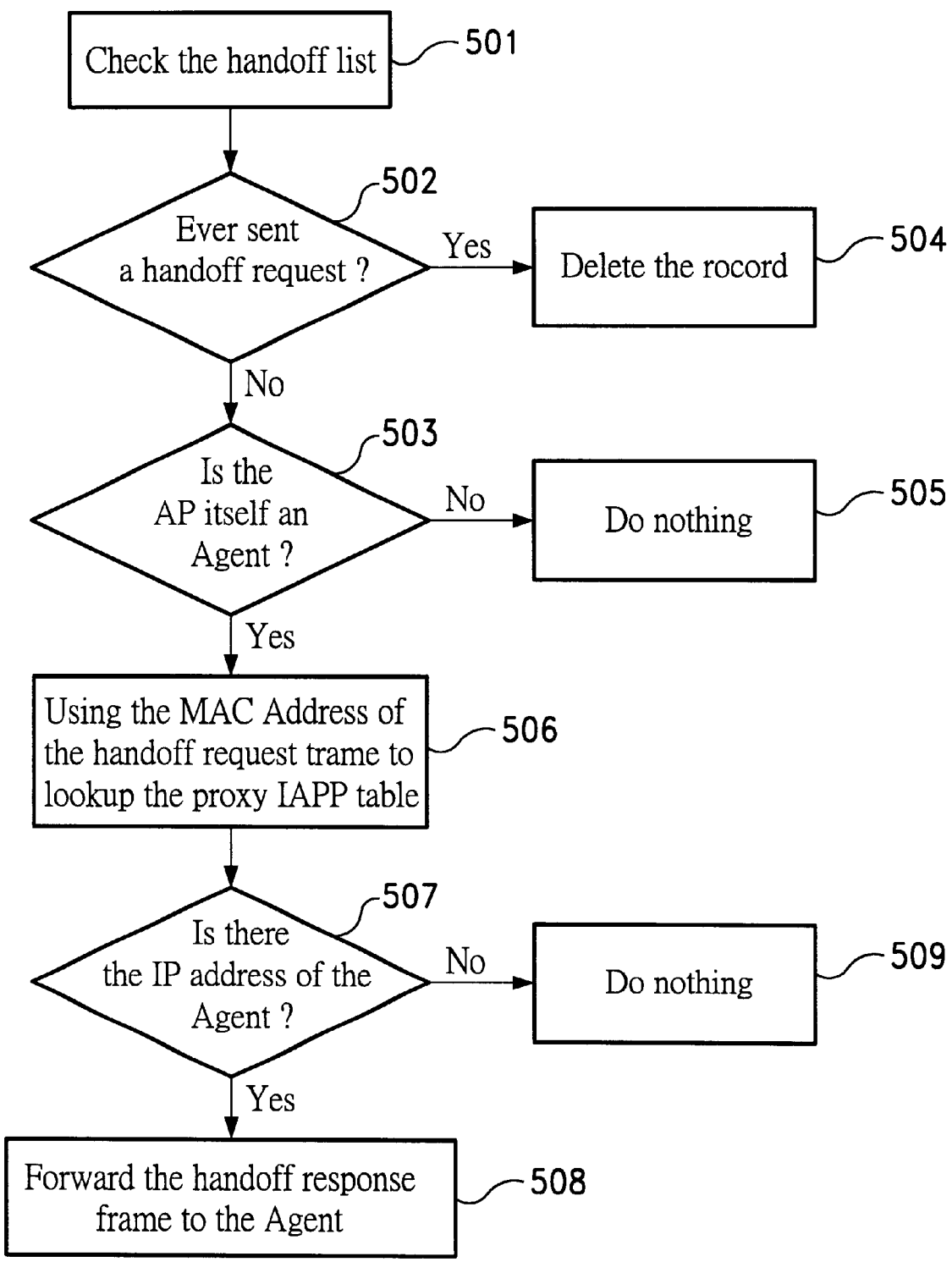
FIG. 5 is a flowchart showing the procedures when receiving the IAPP handoff response according to the method of the present invention.

Refer to FIG. 5 for showing the procedure after the IAPP handoff response frame is received.

501: Check the handoff list.
502: Determine if a handoff request has ever been sent? If yes, go to step 504, if not, go to step 503.
503: Determine if the AP itself is an Agent? If yes, go to step 506. If not, go to step 505.
504: Delete the record.
505: Do nothing.
506: Using the MAC address read from the Handoff response frame to lookup the proxy IAPP table.
507: Determine if the IP address of the Agent is found? If yes, go to step 508, if not, go to step 509.
508: Forwarding the handoff response frame to the Agent.
509: Do nothing.

To sum up, the inventive method integrates the communication mechanisms of mobile IP and IAPP, so as to send the handoff request frame to another WLAN in different IP subnets via mobile IP protocol. Consequently, the routing method of the present invention can successfully facilitate a mobile station to roam among various IP subnets.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for routing datagrams across wireless networks, said wireless networks comprising a plurality of wireless LANs each located in a unique IP subnet, comprising the steps of:

providing a Home Agent and a Home Access Point for a mobile station at its initial wireless LAN;

providing a first Foreign Agent and a first Access Point for said mobile station at a first destination wireless LAN;

receiving a reassociation request frame from said mobile station when said mobile station roams directly from said initial wireless LAN to said first destination wireless LAN;

sending a handoff request frame from said first Access Point to said first Foreign Agent after finishing a reassociation procedure;

using the MAC address of said mobile station to lookup the IP address of said Home Agent in the registration table of said first Foreign Agent when said mobile station has successfully registered to said first Foreign Agent;

establishing a proxy IAPP table in said first Foreign Agent for said mobile station, said proxy IAPP table comprising the MAC address of said mobile station, and the source IP address of said handoff request frame;

forwarding said handoff request frame to said Home Agent according to said IP address of said Home Agent found in said registration table;

looking up the IP address of last Foreign Agent for said mobile station in said registration table of said Home Agent;

when said IP address of the last Foreign Agent is found, forwarding said handoff request frame to said last Foreign Agent;

when said IP address of said last Foreign Agent is not found, determining said last Foreign Agent being the same as said Home Agent;

looking up association table and when said MAC address of said mobile station is not in said association table, broadcasting said handoff request frame in said initial wireless LAN;

deleting a record of said mobile station from an association table of said Home Access Point, and then sending a unicast handoff response frame from said Home Access Point to said Home Agent in response to said broadcast handoff request frame;

sending a unicast handoff response frame from said Home Agent to said first Foreign Agent according to a source IP address recorded in said proxy IAPP table of said Home Agent;

sending said unicast handoff response frame from said first Foreign Agent to said first Access Point according to said source IP address recorded in said proxy IAPP table of said first Foreign Agent; and deleting a record from the handoff list of said first Access Point when said mobile station has ever sent a handoff request frame, thereby to complete a handoff request procedure.

2. The method as claimed in claim 1, further comprising the steps of:

providing a second Foreign Agent and a second Access Point for said mobile station at a second destination wireless LAN;

when said mobile station roams directly from said first destination wireless LAN to said second destination wireless LAN, said second Access Point looking up its AP table and determining said first Access Point not existing in said AP table;

broadcasting said handoff request frame from said second Access Point to said second Foreign Agent;

using the MAC address of said mobile station to lookup the IP address of said Home Agent of said mobile station in the registration table of said second Foreign Agent when said mobile station has successfully registered to said second Foreign Agent;

establishing a proxy IAPP table in said second Foreign Agent for said mobile station, said proxy IAPP table comprising the MAC address of said mobile station, and the source IP address of said handoff request frame;

forwarding said handoff request frame to said Home Agent according to said IP address of said Home Agent found in said registration table;

looking up the registration table of said Home Agent to find the IP address of the Last Foreign Agent;

establishing a proxy IAPP table for said Home Agent, said proxy IAPP table comprising said MAC address of said mobile station, and the source IP address of said handoff request frame;

sending a unicast handoff request frame to said first Foreign Agent according to said IP address of the Last Foreign Agent of said mobile station recorded in said registration table of said Home Agent;

said first Foreign Agent looking up its association table and broadcasting said handoff request frame in said first destination wireless LAN when determining said MAC address of said mobile station not existing in said association table;

deleting a record of said mobile station from an association table of said first Access Point and then sending a unicast handoff response frame from said Home Access Point to said first Foreign Agent in response to said broadcast handoff request frame;

forwarding said unicast handoff response frame from said first Foreign Agent to said Home Agent according to said IP address of the Home Agent recorded in said proxy IAPP table of said first Foreign Agent;

forwarding said unicast handoff response frame from said Home Agent to said second Foreign Agent according to the IP address of the second Foreign Agent recorded in said proxy IAPP table of said Home Agent;

sending said unicast handoff response frame from said second Foreign Agent to said second Access Point according to said source IP recorded in said proxy IAPP table of said first Foreign Agent; and deleting a record from said handoff list of said first Access Point when said mobile station has ever sent a handoff request frame, thereby to complete a handoff request procedure.

3. The method as claimed in claim 1, further comprising the steps of:

when said mobile station roaming directly from said second destination wireless LAN to said initial wireless LAN, looking up said AP table of said Home Access Point and determining the record of said second Access Point not existing in said AP table after a reassociation procedure being complete, broadcasting a handoff request frame from said Home Access Point to said Home Agent;

using the MAC address of said mobile station to lookup the IP address of said Last Foreign Agent in the registration table of said Home Agent when said mobile station has successfully registered to said Home Agent;

forwarding said handoff request frame from said Home Agent to said second Foreign Agent according to said IP address of said Last Foreign Agent of said mobile station found in said registration table of said Home Agent;

establishing a proxy IAPP table for said mobile station in said Home Agent and said proxy IAPP table comprising said MAC address of said mobile station, and a source IP address of said handoff request frame, broadcasting said handoff request frame in said second destination wireless LAN when the MAC address of said mobile station not recorded in the association table of said second Foreign Agent;

deleting the record of said mobile station in said association table of said second Access Point in response to said handoff request frame and sending a unicast handoff response frame to said second Foreign Agent;

sending a unicast handoff response frame from said second Foreign Agent to said Home Agent according to a source address recorded in said proxy IAPP table of said second Foreign Agent;

sending said unicast handoff response frame from said Home Agent to said Home Access Point according to said destination IP address of said handoff response frame recorded in said proxy IAPP table of said Home Agent; and deleting a record from said handoff list of said first Access Point when said mobile station has ever sent a handoff request frame, thereby to complete a handoff request procedure.

4. The method as claimed in claim 1, wherein said Home Agent communicates with network layer protocols, and said Home Access Point communicates with MAC layer protocols.

5. The method as claimed in claim 1, wherein said first Foreign Agent communicates with network layer protocols, and said Home Access Point communicates with MAC layer protocols.

6. The method as claimed in claim 2, wherein said second Foreign Agent communicates with network layer protocols, and said second Access Point communicates with MAC layer protocols.

7. The method as claimed in claim 1, wherein said Home Access Point comprising an AP table, an association table and a handoff list.

8. The method as claimed in claim 1, wherein said first Foreign Agent comprising a registration table, said registration table comprising a MAC address of a mobile station, and the IP address of the Home Agent of the corresponding mobile station.

9. The method as claimed in claim 1, wherein said Home Agent comprising a registration table, and said registration table comprising a MAC address of a mobile station, an IP address of a Last Foreign Agent for said mobile station, and an IP address of a current Foreign Agent of a current wireless LAN.

10. The method as claimed in claim 2, wherein said second Foreign Agent comprises a registration table, and said registration table comprising a MAC address of a mobile station, and the IP address of the Home Agent of the corresponding mobile station.

11. The method as claimed in claim 1, wherein said Home Agent and said first Foreign Agent follows mobile IP communication mechanism.

12. The method as claimed in claim 2, wherein said second Foreign Agent follows mobile IP communication mechanism.

13. The method as claimed in claim 1, wherein said Home Access Point and said Home Access Point follows Inter Access Point Protocol communication mechanism.

14. The method as claimed in claim 2, wherein said second Access Point follows Inter Access Point Protocol communication mechanism.

* * * * *